Figure 1:
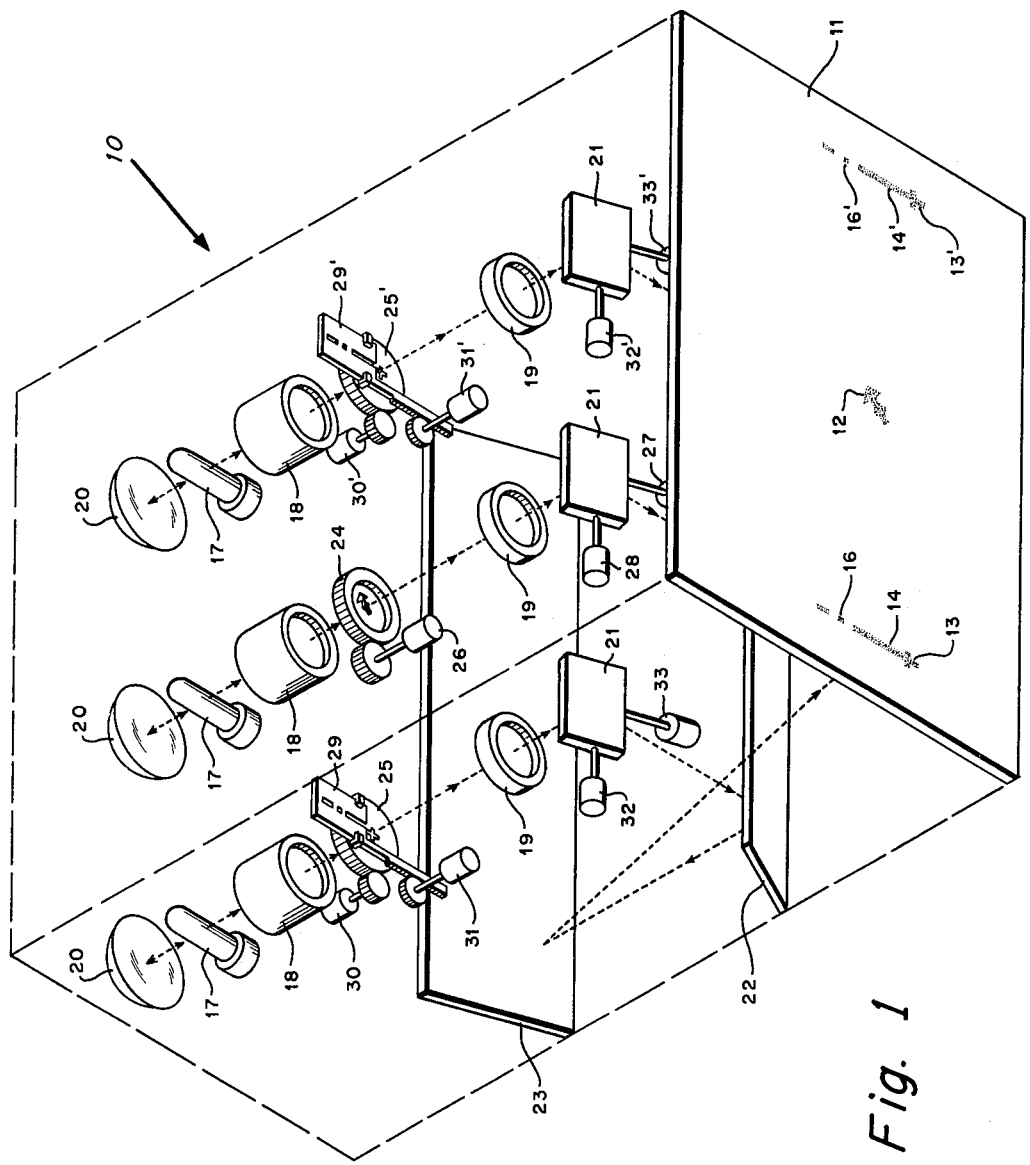

Jan. 11, 1966 P. G. HOLT 3,228,281
TACTICAL NAVIGATION DISPLAY SYSTEM
Filed Sept. 1, 1961 9 Sheets-Sheet 1

INVENTOR.
PLINY G. HOLT
BY
ATTORNEY

Jan. 11, 1966 P. G. HOLT 3,228,281
TACTICAL NAVIGATION DISPLAY SYSTEM
Filed Sept. 1, 1961 9 Sheets-Sheet 3
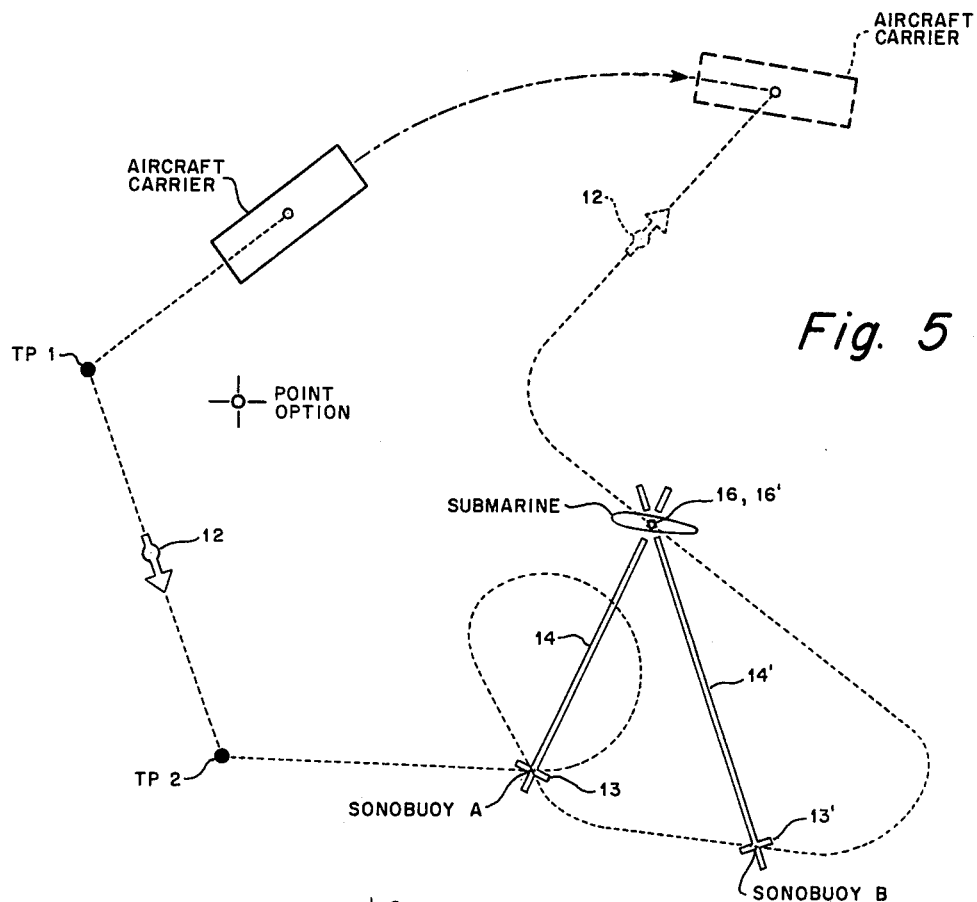
Fig. 5
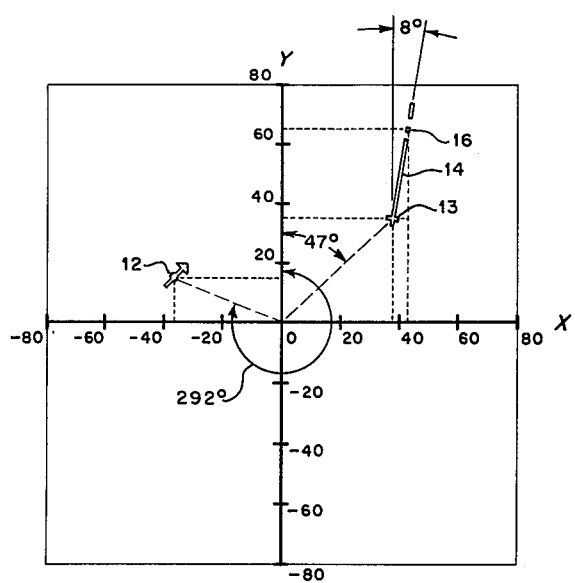
Fig. 3
INVENTOR.
PLINY G. HOLT
BY
ATTORNEY Jan. 11, 1966  P. G. HOLT  3,228,281
TACTICAL NAVIGATION DISPLAY SYSTEM
Filed Sept. 1, 1961  9 Sheets-Sheet 4

INVENTOR.
PLINY G. HOLT
BY
ATTORNEY

United States Patent Office 3,228,281
Patented Jan. 11, 1966

3,228,281
TACTICAL NAVIGATION DISPLAY SYSTEM
Pliny G. Holt, Carmel, Calif., assignor to the United States of America as represented by the Secretary of the Navy
Filed Sept. 1, 1961, Ser. No. 136,982
15 Claims. (Cl. 88—1)
(Granted under Title 35, U.S. Code (1952), sec. 266)

The invention herein described may be manufactured and used by or for the Government of the United States of America for governmental purposes without the payment of any royalties thereon or therefor.

The present invention relates to a tactical navigation system for aircraft, and more particularly to an aircraft ground track indicator integrally and mutually correlated in a tactical situation to relieve the pilot of the numerous and complex functions necessary to carry out a successful mission.

Tactical situations in which the aircraft plays an important role have become very complex in nature thus placing greater mental and physical demands on the pilot and his crew. Their many responsibilities must be co-ordinated rapidly and precisely at all times during a mission to insure its complete success. In smaller types of aircraft where the crew size is limited, these responsibilities for the various equipment used during a mission placed an intolerable burden on the pilot often resulting in aborted missions. Certain antisubmarine warfare (ASW) missions, for instance, require that a search aircraft take a pre-selected flight path dependent upon the technique of submarine detection employed. When sonobuoys are used for localizing a submerged target, their ground position must be known to the pilot so that he may execute the proper commands to the aircraft for further localization and then attack. During routine search missions, pre-flight briefings usually tell the pilot of a proposed complete flight pattern from the take-off point on an aircraft carrier, over the water area of interest, to the return to the ship.

Conventional flight path recorders simply plot the course actually taken by an aircraft without regard to the tactical mission being executed. Such recorders, for example, do not provide for recording sonobuoy placement information or for computing range and bearing between any of a plurality of ground positions or fixes and aircraft position. The present state of the art provides ground position indicators and flight path recorders from which the pilot must still mentally correlate navigational information to a prescribed tactical mission, including flight guidance and sonobuoy placement information, in order to insure a successful mission. Existing automatic flight control systems have been limited in function to guidance information to single-point destinations. They do not provide guidance information for a complete circuitous flight path nor are they adapted to receive sonobuoy placement and detection information as required in ASW missions.

The present invention, in general, correlates a ground track indicator with tactical situations in a single computer-display apparatus thereby presenting a visual display to the pilot of the position and bearing of the aircraft relative to one of a plurality of ground positions at any time during the mission. The invention is especially adapted for receiving and displaying information necessary for carrying out an ASW detection, localization and attack mission.

Accordingly, it is an object of the present invention to provide a single display apparatus for an aircraft in which a ground track indicator can be superimposed by tactical situations, in which the position and bearing of the aircraft relative to any one of a plurality of ground positions pertinent to the tactical situation can be computed and displayed at any time during an aircraft mission, in which sonobuoy placement and detection information can be received and displayed for carrying out an ASW mission, and in which the pilot and crew are enabled to carry out complex missions rapidly and precisely without excessively adding to their responsibilities.

Another object of the invention is to provide a continuous display to the pilot of the aircraft position relative to discrete ground points which have their positions memorized in the apparatus, in which the display serves as a plotting board for localizing submerged objects from information received by sonobuoys placed at known geographical positions, in which the bearing and range between the aircraft position and any one of several points memorized in the apparatus can be read out at any time, and in which the position of the aircraft relative to a fixed geographical position is continuously measured and cannot be disturbed throughout a mission.

Still another object of the invention is to provide apparatus in which the indicated aircraft position can be corrected for discrepancies between the actual and indicated positions of the aircraft.

A further object of the invention is to provide ground track indicating apparatus in which wind direction and velocity which can be automatically computed and used to correct the tracking speed of the aircraft indicator.

A still further object of the invention is to provide a relatively simple and inexpensive aircraft tactical navigation display apparatus capable of wide application and utility in military missions or any other operations wherein the aircraft must be directed along discrete flight paths relative to known geographical positions.

Various other objects and advantages will appear from the following description of one embodiment of the invention, and the most novel features will be particularly pointed out hereinafter in connection with the appended claims.

Figure 2:
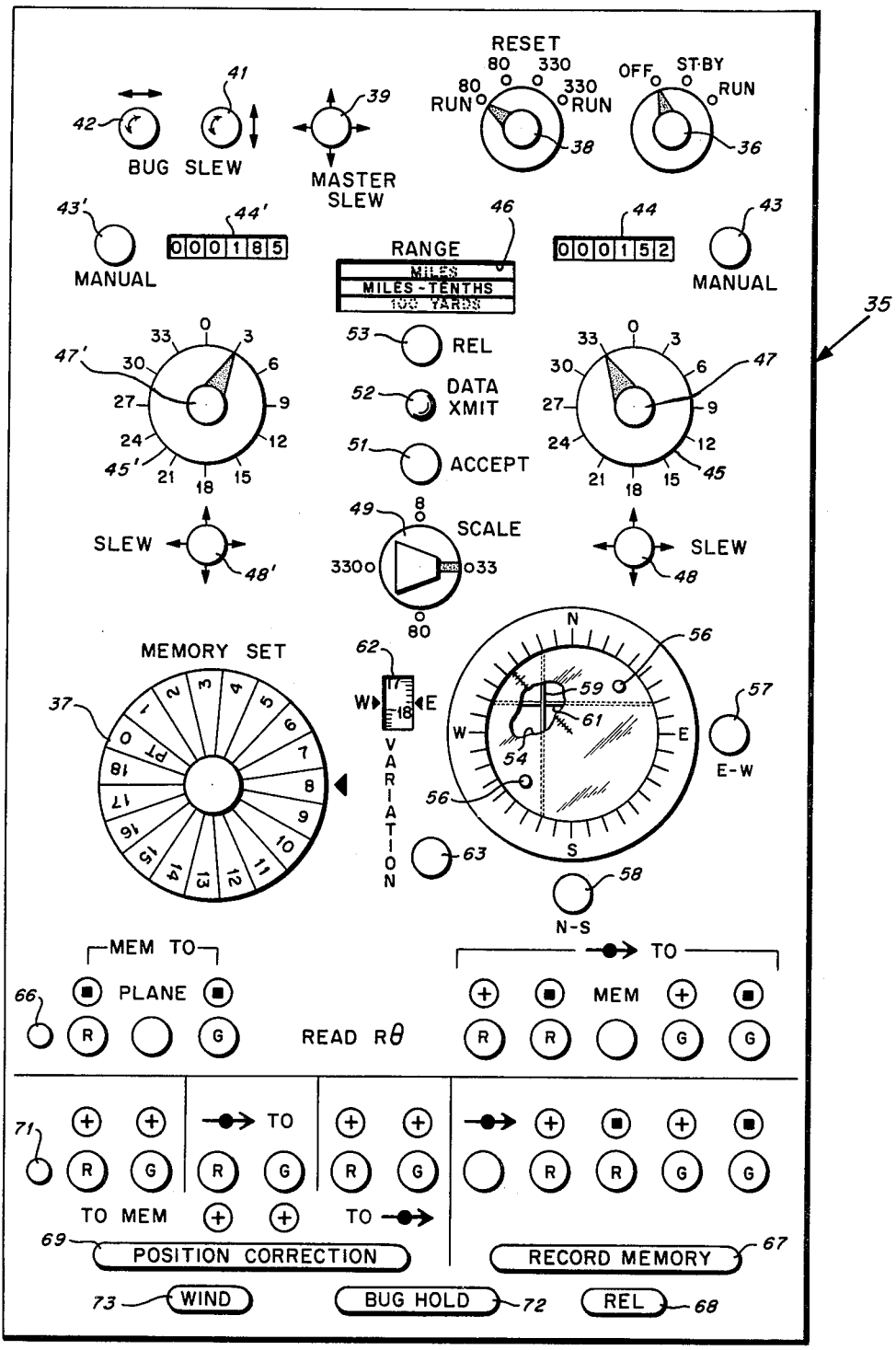
Figure 4A:
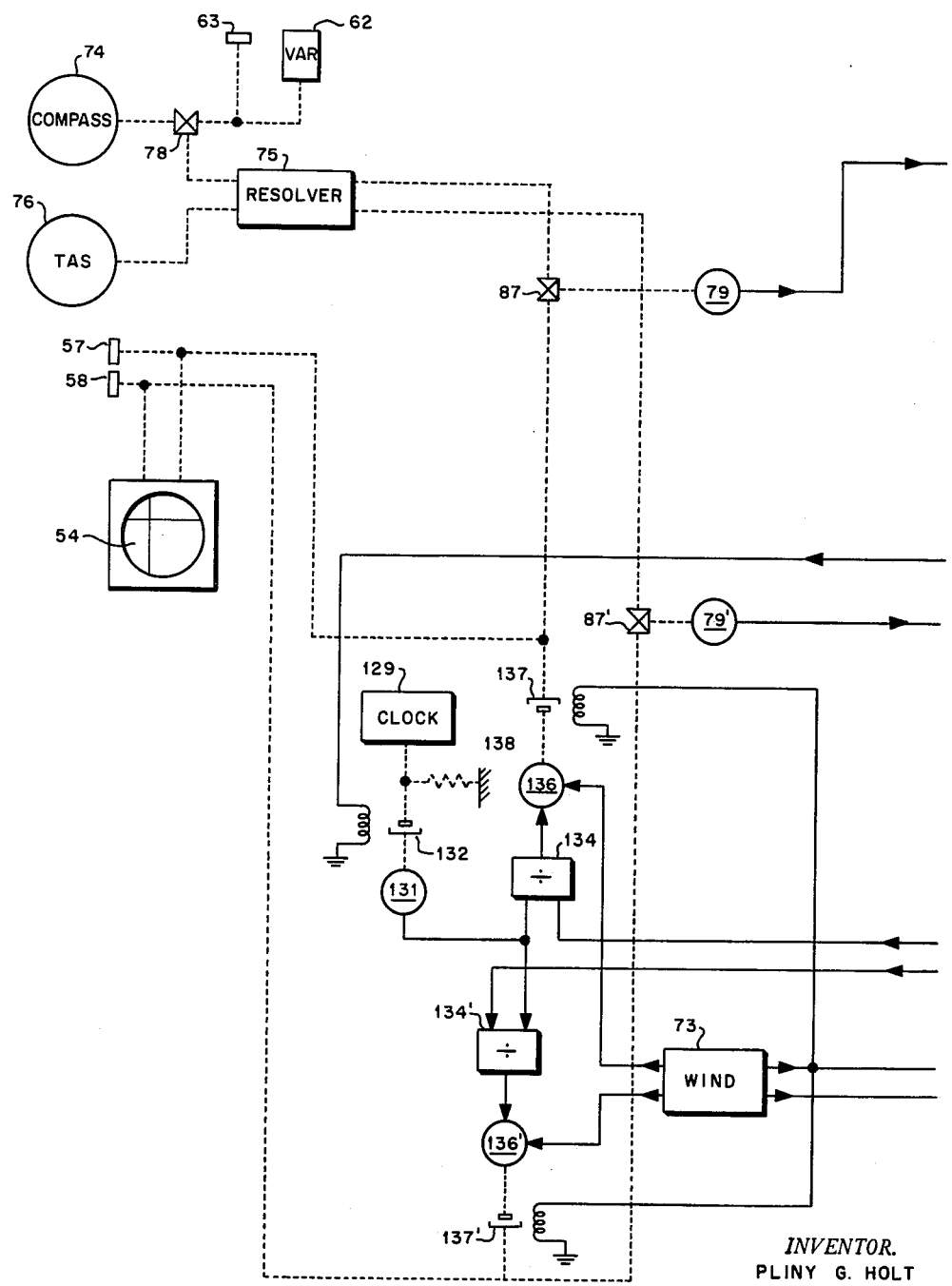
Figure 4B:
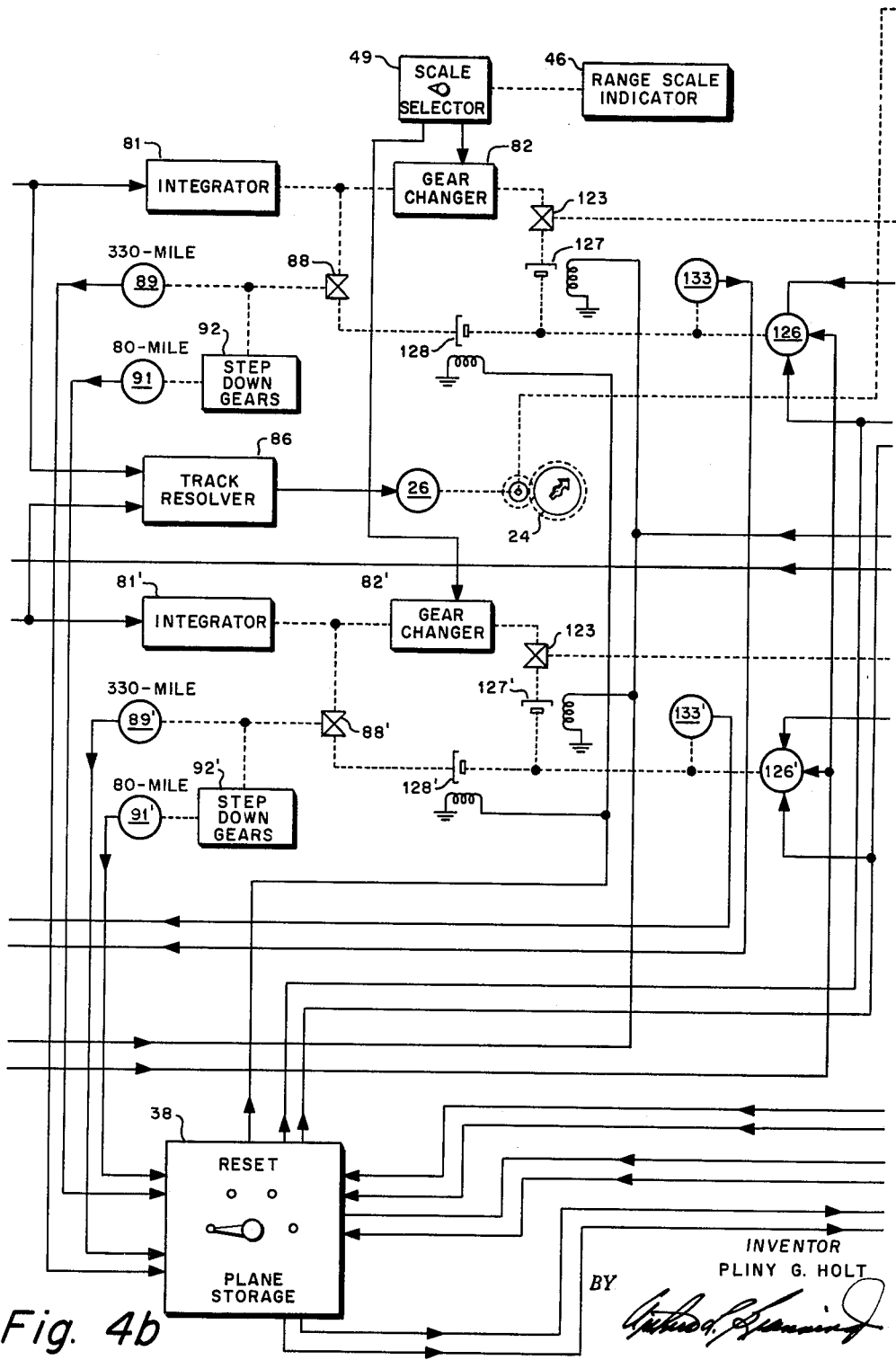
Figure 4C:
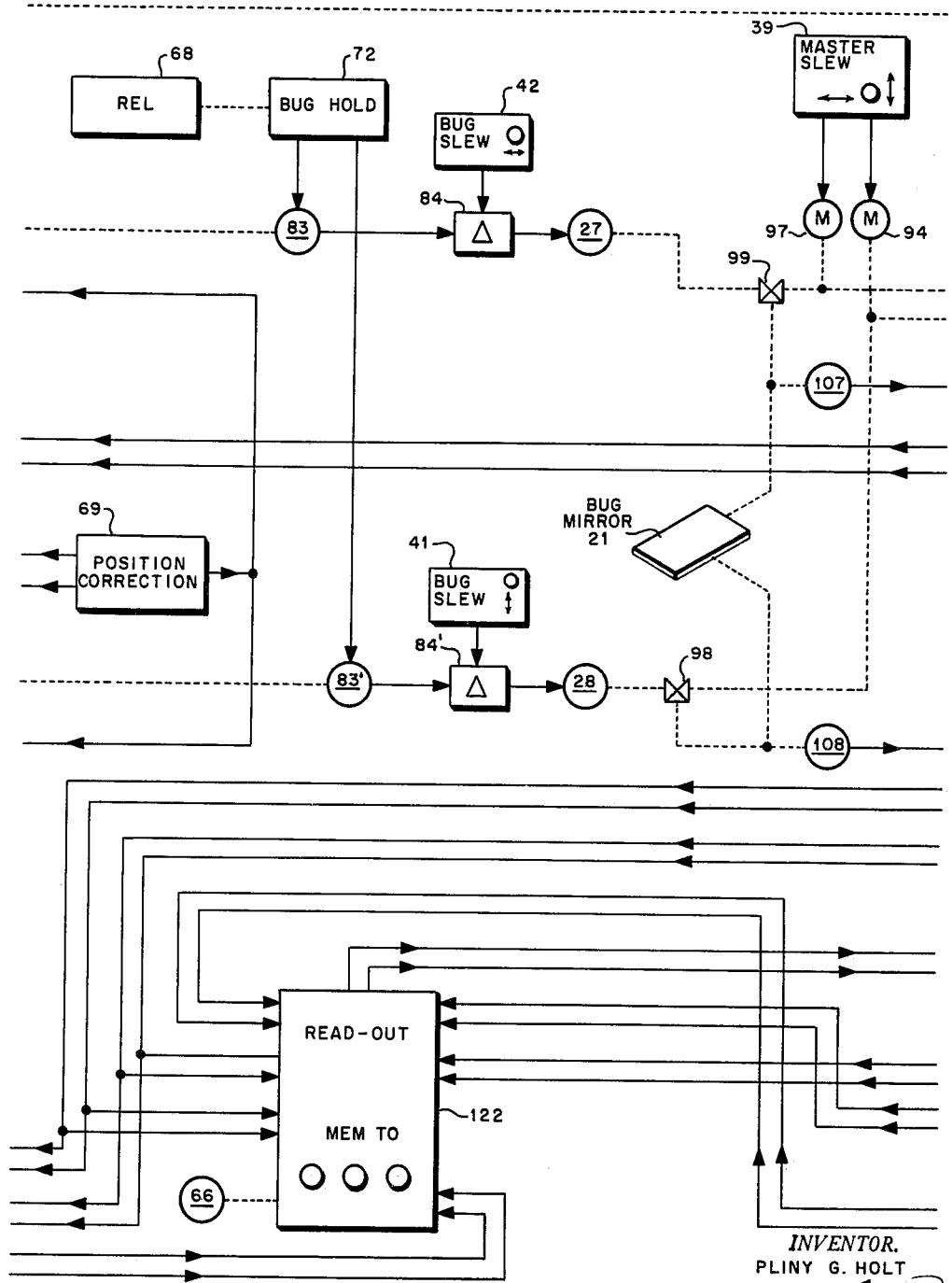
Figure 4D:
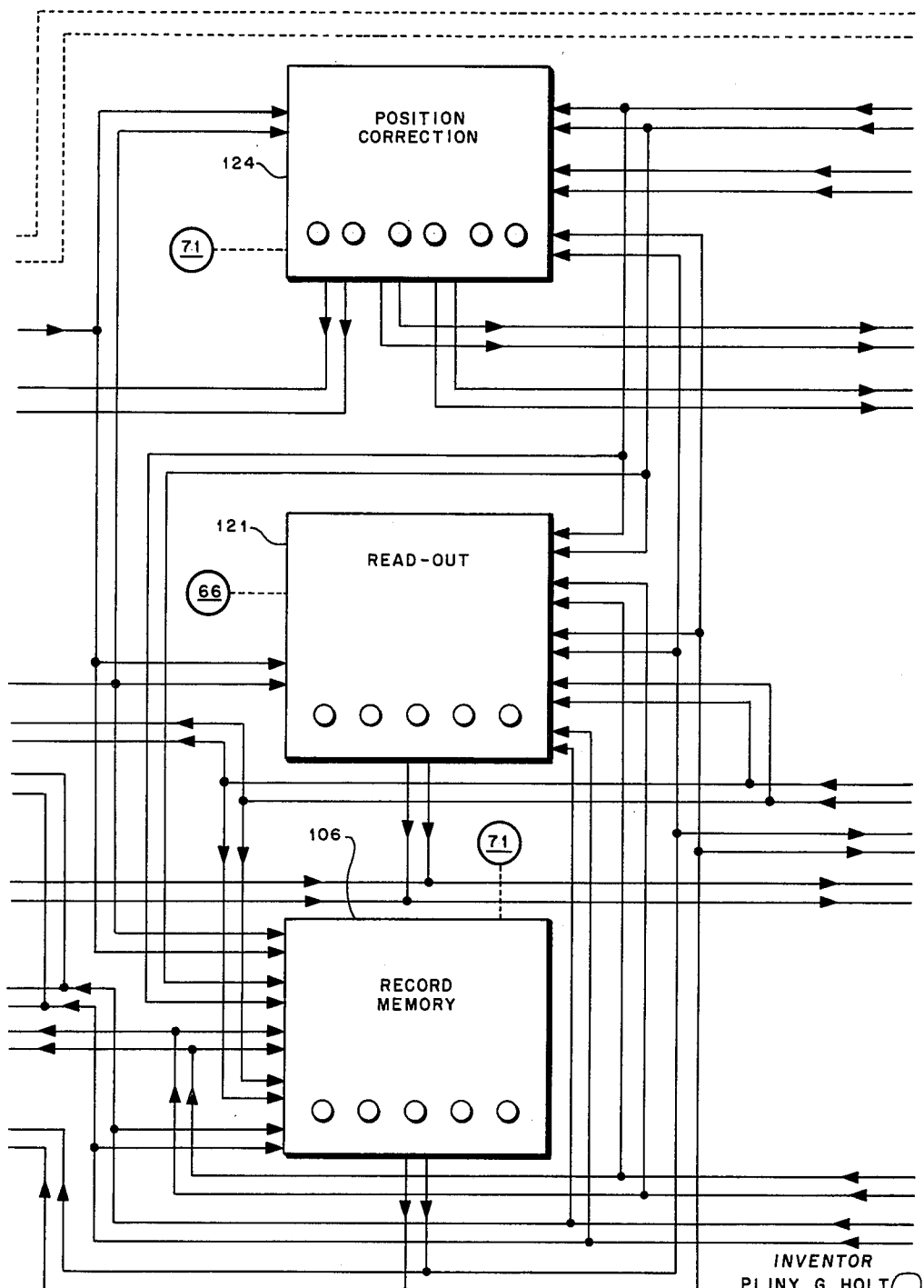

In the accompanying drawings;
FIG. 1 represents an isometric view of principal elements in the main display unit, with its housing removed, of the tactical navigation apparatus of the present invention;
FIG. 2 represents a front view of the main control unit of the invention;
FIG. 3 represents several symbols of the display unit of FIG. 1 superimposed with Cartesian coordinates;
FIGS. 4a, b, c, d, e and f represent a single-line diagram of the invention; and
FIG. 5 represents a typical tactical situation superimposed on the indicated ground track of an aircraft.

*Main display*

In the illustrated embodiment of the invention, a main display unit, indicated generally by the numeral 10, includes fittings, not illustrated, for mounting in the instrument panel of an aircraft approximately at the center line thereof in order to be in full view of the pilot and co-pilot, if any. The unit 10 displays the navigational and tactical information in the form of lighted, color-coded symbols on a display surface representing, to scale, a finite geographical area. The display surface is a rectangular translucent screen 11, such as Plexiglas, supported in a substantially vertical plane. The screen 11 is specially treated, for example, with Polacoat, to improve light transmission and to reduce parallax error in the displayed symbols. It is contemplated that the front or outer surface of the screen 11 be used for marking with grease pencils and that means be provided for attaching gridded or chart overlays to the front of the screen 11 for estimating positions or to facilitate manual plotting.

Three symbols are projected onto the screen 11 from the rear and are visible to an observer from wide viewing angles in front. The symbols are a bug 12, green and red markers 13 and 13', and green and red target strobes 14 and 14'. The bug 12 is a white lighted arrow representing the aircraft. Its position on the screen 11 corresponds, at a selected scale, to the relative position of the aircraft from a known position of a geographical reference point or fix. The motion of the bug 12 across the screen 11 is controlled by a ground track computer, and its direction, as indicated by the arrow, is determined by a track resolver connected to the ground track computer. By means to be more fully explained later in the disclosure, the bug 12 can be manually or automatically shifted or slewed to any position on the screen 11. The green and red markers 13 and 13' are green and red lighted crosses, respectively, which are used to mark the positions of sonobuoys, MAD contacts, datums, or other ground positions of interest. The markers 13 and 13' are also capable of being slewed anywhere on the screen 11 by means to be later explained. The green and red target strobes 14 and 14' are green and red lighted lines radiating from their respective markers 13 and 13', their lengths being determined by the short separated portions at the ends respectively opposite of their respective markers 13 and 13'. These portions are hereinafter identified and referred to as green and red targets 16 and 16'. The length of the strobes 14 and 14' are automatically or manually adjustable, and are manually rotatable in azimuth about their respective markers 13 and 13'. The strobes 14 and 14' are primarily intended for setting up search plans, plotting radar contacts, plotting sonobuoy localization information, displaying electronic countermeasure positions, plotting ranges and bearings, and other tactical information.

The display symbols are formed and projected onto the screen 11 by three separate and independently operated light-projecting systems, each comprising a light source or lamp 17, condenser lenses 18, a projection lens 19, a movable mirror 21, and lamp reflectors 20. The projection lenses 19 also include color filters to give the desired color of the light on the screen 11. The light provided by each lamp 17 and reflector 20 is concentrated into beams by the lenses 18 which are subsequently projected by the lens 19 to the mirror 21. The movable mirror 21 is so slanted that it reflects the image formed thereon to a forwardly disposed slanted fixed mirror 22. Then the image is reflected rearward toward a rearwardly disposed slanted fixed mirror 23 which finally reflects the image forward onto the display screen 11. The light beams for the bug 12 emanate from the center projecting system with the image of the bug 12 being formed by a rotatable bug reticle 24 located between lenses 18 and 19 on the optical axis thereof. The angular position or heading of the bug 12 is determined by a bug reticle transducer 26 which causes angular displacement of the reticle 24 about its optical axis. The vertical and horizontal displacements of the bug 12 on the screen 11 are determined by bug mirror transducers 27 and 28, respectively, which cause angular movement of the mirror 21 about normal axes in the plane thereof.

The green marker 13 and strobe 14 configurations appearing on the screen 11 are formed by a rotatable marker reticle 25 located between lenses 18 and 19 on the optical axis thereof. The strobe 14 azimuth is determined by a marker reticle transducer 30 which causes angular displacement of the marker reticle 25 about its optical axis. The length of the green strobe 14, as measured from the marker 13 to the target 16, is formed by a target reticle 29 connected to the marker reticle 25 so as to be slidable relative thereto and rotatable therewith. The strobe 14 length is determined by a target reticle transducer 31 which causes relative linear displacement of the target reticle 29 along the length of the strobe 14 configuration of the marker reticle 25. Similarly, the red marker and strobe 13' and 14', respectively, are formed by marker and target reticles 25' and 29' and their corresponding transducers 30' and 31'. Vertical and horizontal displacements of the green and red markers 13 and 13' are determined by motors 32, 33 and 32', 33' on their respective mirrors 21 in the same manner as for vertical and horizontal bug displacement.

*Main control panel*

Operation of the main display unit 10 and other computations to be described later is derived through a main control unit, indicated generally by the numeral 35, having a front panel as illustrated in FIG. 2. It is contemplated that the unit 35 also be located in the main instrument panel of the aircraft next to the main display unit 10.

A MODE switch 36 in the upper right corner of the control panel contains three positions: OFF, STANDBY, and RUN. In the OFF position, all power to the apparatus is disconnected; on STANDBY, the position of the greenmarker 13 can be stored in a memory set 37 at the position marked PT O (Point Option); and in the RUN position, power is supplied to all circuits.

A PLANE POSITION STORAGE switch 38 notches the aircraft or plane position to a fixed geographical position. When the green target 16 is set on the aircraft's take-off position, and the switch 38 is placed at 80 RESET or 330 RESET, with the MODE switch 36 on STANDBY, the plane position is aligned with the take-off position. Thereafter, when the switch 38 returns to the 80 RUN or 330 RUN position, the aircraft progress will be continuously recorded relative to the take-off point.

To the left of the switch 38, is a four-way MASTER SLEW switch 39 which moves all of the symbols on the screen 11 simultaneously to offset the entire tactical and navigational display. Master slewing will not disturb subsequent readouts, position corrections and memory functions as it is independent of these functions. Bug slewing is also provided by a vertical BUG SLEW switch 41 and a horizontal BUG SLEW switch 42 for driving the bug 12 to any point on the display screen 11 independently of the other symbols.

STROBE RANGE controls 43 and 43' provide for manually varying the lengths of the green and red strobes, respectively, as measured between their respective markers and targets. STROBE RANGE counters 44 and 44' indicate the distance or range to which the green and red strobes 14 and 14' have been set. The counters 44 and 44' may be the cyclometer type and read in miles, miles and tenths, or hundreds of yards, depending upon the display scale selected. An indicator 46, located between the counters 44 and 44', show the scale units being displayed on the counters 44 and 44'. The angular positions of the strobes 14 and 14' about the corresponding markers 13 and 13' are varied by STROBE AZIMUTH controls 47 and 47', respectively. Azimuth Indicators 45 and 45' in divisions of three graduated degrees are provided to show the bearing at which the strobes 14 and 14' have been set. MARKER SLEW controls 48 and 48' are also provided for slewing the red and green markers 13 and 13' and their associated target strobes 14 and 14' to any position on the screen 11. The controls 48 and 48' are four-way toggle switches which move the markers 13 and 13' vertically and horizontally through the appropriate marker mirror transducers 32, 32', 33 and 33'.

Depending upon a particular scale selected, the display screen 11 represents a rectangular geographical area of a known range. The particular display screen 11 illustrated is of square configuration with North at the top and East at the right side. Of course, the geographical orientation of the screen 11 may be at any convenient azimuth suitable for the particular tactical situation involved. A SCALE SELECTOR switch 49 provides for manually selecting one of several scales on which the tactical navigation system is to operate. In the illustrated embodiment, these scales are 8, 33, 80 and 330 and represent ground distances in nautical miles across the North-South and East-West dimensions of the screen 11. Several actions are associated with scale changing which will be set forth in more detail in connection with FIGS. 4a–f.

The present invention is particularly adapted for use with sonobuoys in detecting and localizing submerged vessels at sea. For instance, in the JULIE technique of localization, two sonobuoys are used for fixing the submerged object by explosive echo ranging. The green and red markers 13 and 13' display the positions of the two sonobuoys, while their respective strobes 14 and 14' display the ranges from the sonobuoys to the submerged object. An ACCEPT push-button 51 governs the automatic transfer of sonobuoy range information from remotely located transmitters to the unit 35 to automatically adjust the length of strobes 14 and 14'. When the push-button 51 is depressed, the target reticle transducers 31 and 31' drive the target reticles 29 and 29' to the ranges dictated by the remote transmitters. A DATA XMIT signal light 52 is energized from the remote location to indicate at the main control unit 35 that automatic range inputs are available to the system for display. A RELEASE push button 53 disables the remote transmitters, returns strobe range to manual control, and extinguishes the DATA XMIT light 52.

Motion of the bug 12 on the display screen 11 corresponds to the ground track of the aircraft throughout a tactical mission. One method of obtaining the ground track is by measuring true airspeed and heading of the aircraft, estimating wind velocity and direction, computing the resultant ground speed and direction using the basic navigational triangle of wind and true airspeed vectors and integrating the resultant velocity. It is contemplated that ground track may also be derived from other methods such as Doppler radar. For the illustrated embodiment, however, a WIND SET AND INDICATOR 54 is provided for inserting forecasted wind data. A transparent rotatable indicator 54 having a radially inscribed arrow thereon is manually set with the aid of finger bosses 56 at the direction from which the wind is blowing. The inscribed arrow is graduated along its length to correspond to range wind speeds in knots. The total wind vector is resolved into horizontal and vertical components by the adjustable knobs 57 and 58, respectively. In the illustrated embodiment, these vectorial components correspond to East-West and North-South components. The knobs 57 and 58 are mechanically connected to cursors 59 and 61, respectively, located beneath the transparent indicator 54 and move in horizontal and vertical directions, respectively. When the two cursors 59 and 61 intersect along the arrow at the forecasted wind velocity, the wind vector is resolved into its vertical and horizontal components. In order to compensate the compass for magnetic variations from true aircraft heading, an indicator 62 and an adjusting knob 63 are provided for manually inserting a correction. The amount of magnetic variation set into the system thus appears on the indicator 62.

A storage unit is provided in the system for memorizing the ground position of a plurality of different geographical points in cells. In the illustrated embodiment of the invention, the storage unit includes a MEMORY SET selector switch 37 having 19 positions representing 19 memory cells. One of the 19 cells, identified at PT O, is reserved for memorizing a master navigational or security reference position such as a base, POINT OPTION or POINT X-RAY. The remaining 18 cells may be used for storing search turning points, sonobuoy positions, and other datum fixes. As noted previously in connection with the MODE switch 36, the PT O position on the switch 37 is electrically interlocked with the switch 36 so that the reference point can be stored only in the STANDBY position. This insures that the reference position data is not inadvertently erased while storing other information in the storage unit during normal operation. Associated with each position on the selector switch 37, is a segment on which data can be noted in pencil relating the memorized point with a particular scale at which it was memorized, with time or other pertinent information. Inasmuch as memorized positions are related to distances in the display rather than to miles, read-out information obviously will be correct only when the original scale on which the information was placed in memory is again selected. Therefore, scale notations in the segments of switch 37 are of particular importance. The memory cells are cleared by dialing to the particular point and setitng in new data.

Figure 4E:
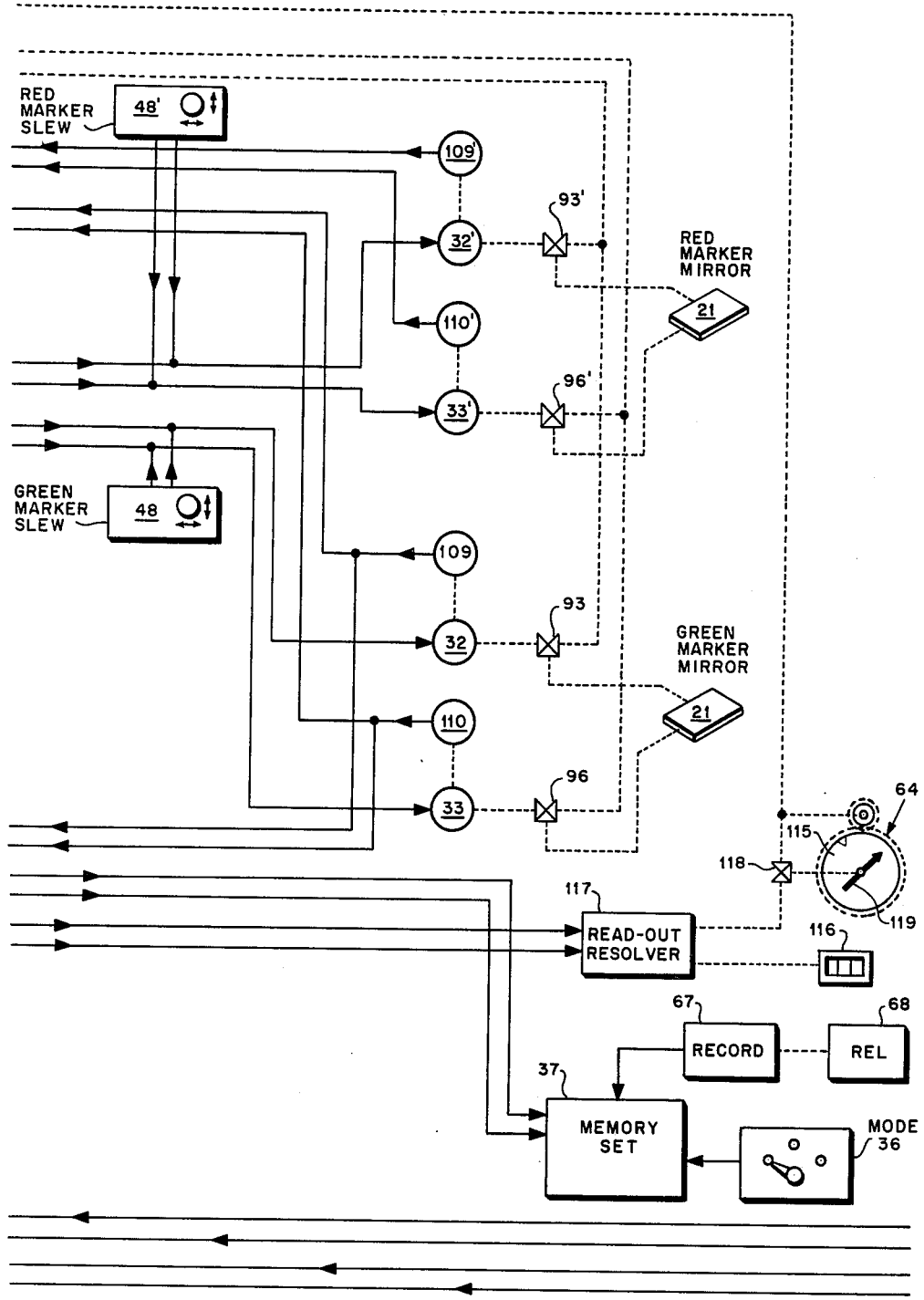
Figure 4F:
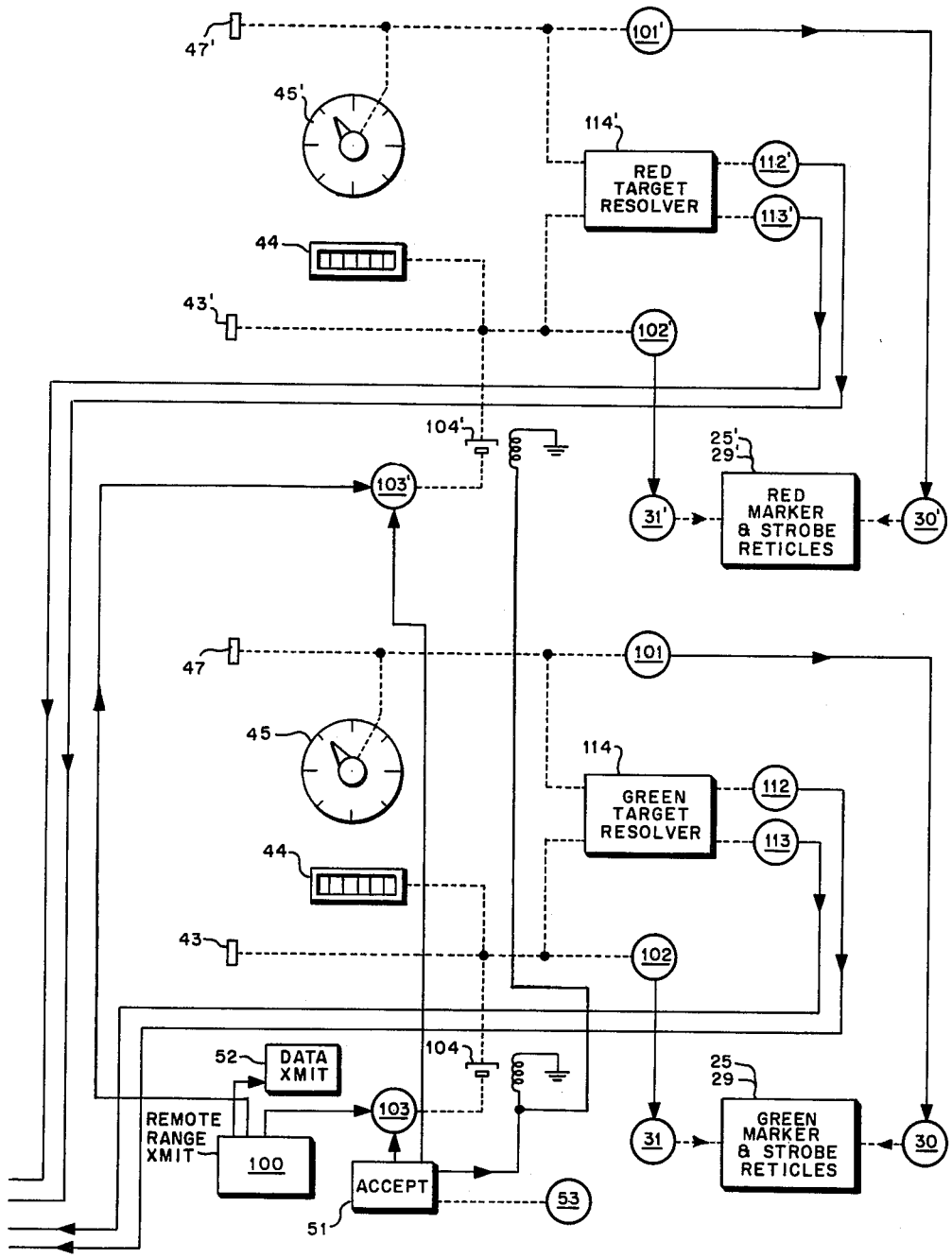

The entire top row of push-buttons select the input to a read-out instrument identified as an R-θ (range-bearing) indicator 64 (FIG. 4e). There are two banks of push-buttons in this row: the first bank (right of center) provides R-θ information from the bug 12 to the green and red markers 13 and 13', to the green and red targets 16 and 16', or to any point in memory. The other bank (left of center) provides for read-out from any point in memory to the actual plane position or to the green and red targets 16 and 16'. A mechanically interlocked push-button release 66 at the extreme left of both banks releases any depressed push-button in the row.

The bank of first five push-buttons (right of center) in the second row select the circuits for storing positions in memory through the selector switch 37. These are: the bug 12, the red and green markers 13 and 13', and the red and green targets 16 and 16'. A RECORD MEMORY actuating bar 67 located immediately below this bank of push-buttons actuates the circuits for storing position data in memory as selected. The RECORD MEMORY bar 67 is mechanically interconnected to a REL (release) bar 68 whereby the bar 67 is maintained depressed until released by the REL bar 68. The bar 67 is made of translucent material with an amber light therebehind which blinks when depressed. In ASW aircraft, it is contemplated that the RECORD MEMORY bar 67 be parallelled to its sonobuoy release button on the pilot's control column thereby insuring the recording and memorizing of positions of sonobuoys as they are dropped.

The remaining bank of six push-buttons (left of center) in the second row provides for the automatic positioning of the display symbols. A POSITION CORRECTION actuating bar 69 directly beneath this bank of push-buttons establishes the circuits for carrying out the symbol movements as directed by the particular push-button depressed. The bar 69 must be held depressed until the symbol has been fully re-positioned. A push-button release 71 at the extreme left of both banks of push buttons in the second row is mechanically interlocked for releasing any push-button from its mechanically held depressed position.

During the normal tracking of the bug 12 it may be desirable to interrupt its motion to establish its position as a navigational fix. A BUG HOLD bar 72 at the bottom center of the control unit 35 will stop the bug 12 when it is depressed. The bar 72 is also translucent so that a red light therebehind blinks until the bar 72 is released through a mechanical interlock by the REL (release) bar 68. When released, the bug 12 will advance immediately to the position of actual ground track position. It is contemplated that an additional switch may be added so the BUG HOLD can be operated remotely from another operator position in the aircraft. For example, if the radar equipment should fail while maintaining a target contact, the operator may wish to record the last position of the aircraft at the time of failure in order to reduce the errors in estimating the target position after an elapsed time.

Under normal circumstances it is desirable at least once during a mission to find or compute a new wind speed vector for applying to the navigational triangle. A special facility is incorporated in the tactical navigational system to permit this operation with a minimum of time and effort and without the need to fly the aircraft in any particular pattern at a constant speed. In combination with the POSITION CORRECTION push-buttons and bar 69, a WIND bar 73 is provided for accomplishing this function and will be explained in further detail in connection with FIGS. 4a–f.

Ground tracking

Most data processed in the apparatus are in Cartesian coordinates with the geometric center of the display screen 11 being the point of origin. The horizontal and vertical axes intersecting this origin are hereinafter identified as X and Y axes. The coordinates take the form of voltages, shaft rotation rates or rotor displacement angles dependent upon the type of circuit best suited. Positive direction of the X and Y axes are at the top and right side, respectively, of the screen 11. By algebraically summing the X and Y displacements, it is possible to determine the selected positions of any two recorded points. FIG. 3 illustrates this point. The green marker 13 is shown positioned about $\theta=47°$ (clockwise from North) and $R=51$ nautical miles from the center of the screen 11 or from origin. The bug 12 is shown at about $\theta=292°$ and 40 nautical miles from the origin. Assuming a relationship of one volt per nautical mile, the marker position is $x=+37$, $y=35$; and the bug position is $x=-37$, $y=+15$. The position of the marker 13 relative to the bug 12 then is $x=+74$, $y=+20$. This algebraic process actually takes place in a summing network from which the result is fed into the R-$\theta$ resolver 64 where they are read out as range and bearing. The X and Y coordinates of the bug 12, the markers 13 and 13', and the targets 16 and 16' relative to their respective markers, are reduced to discrete electrical signals, indicative of sign and magnitude, by transducers mounted on the appropriate shafts. The electrical outputs of these transducers are used in comparison or summing networks which will be later described. The transducers may be of any type, such as linear transformers, which produce discrete electrical signals at their outputs indicative of an angular shaft position at their inputs. The manner in which the transducers are interconnected is governed by the particular function to be performed. A plurality of manual push-button type electrical switches are therefore provided for establishing circuits necessary for accomplishing these functions.

Applying the Cartesian coordinate concept to the system, the motion of bug 12 is made proportional to the ground track of the aircraft. Referring to FIGS. 4a–f, a TAS speed (true airspeed) vector, defined by the rotor displacement angles at the output of a compass transducer 74 and a TAS transducer 76, is resolved from polar coordinates into Cartesian coordinates in a TAS resolver 75. The magnetic heading measured by the compass transducer 74 is corrected at its output for East or West magnetic variations by the adjusting knob 63 through a mechanical differential 78, thereby giving true heading of the TAS.

The wind velocity vector of the navigational triangle is inserted into the system by means of the wind set and indicator 54. The indicator 54 is rotated until the arrow inscribed thereon is at the forecasted wind direction for the flight altitude to be flown. The adjusting knobs 57 and 58 are then turned until the cursors 59 and 61 intersect along the arrow at the forecasted wind velocity. The angular shaft position of the knobs 57 and 58 thus represent the X and Y components of the wind velocity vector and they are combined with the corresponding components of true airspeed at differentials 87 and 87', respectively, where they are algebraically summed to produce the X and Y components of the ground speed vector. These, in turn, are fed to ground speed transducers 79 and 79'.

The electrical output from the ground speed transducer 79 is connected to the input of an integrator 81 where it is integrated over time to produce a progressive shaft rotation proportional to the ground track of the aircraft in the X direction. This shaft rotation drives a ground track transducer 83 through a gear changer 82 which applies a desired scale factor. The gears are electrically changed by the scale selector switch 49. Simultaneously, the range scale indicator 46 will indicate the particular scale selected. In the illustrated embodiment, the 8-mile scale reads in hundreds of yards, the 33-mile scale in miles and tenths, and the 80-mile and 330-mile scales in miles. The electrical output of the ground track transducer 83 drives the big mirror transducer 27 through an electrical differential 84. The horizontal bug slew switch 42 applies a slewing bias into the signal to the transducer 27, which, in turn, transforms the signal into angular shaft rotation which ultimately drives the bug mirror 21 as a function of the X component of ground track. The BUG HOLD bar 72 is electrically connected into the transducer 83 to interrupt the output signal thereby instantly stopping the bug 12 in the horizontal direction. This feature is valuable upon obtaining radar or ECM contacts, particularly on a disappearing target. When the BUG HOLD bar 72 is depressed, it is mechanically held until released by the interlocking release push-button 68. The bug 12 will then skip forward to the position it would be absent the interruption.

In a manner similar to obtaining the X component of ground track, the Y component is obtained through a transducer 79', integrator 81', gear changer 82', transducer 83', and electrical differential 84'. The bug mirror 21 is rotatably driven by the transducer 83' to produce vertical bug motion on the display screen 11 as a function of the Y component of ground track. The BUG HOLD bar 72 also connects to the transducer 83' to interrupt and stop bug motion in the vertical direction.

The electrical signals from the transducers 79 and 79' which represent the X and Y components of the ground speed vector are also connected to the inputs of a ground speed resolver 86 where they are resolved into a vector angle representing the aircraft heading. The output electrical signal thus formed is transformed into an angular shaft position by the bug reticle transducer 26 which is mechanically coupled to the bug reticle 24. The aperture in the reticle 24 thus rotates to show the aircraft heading on the screen 11. The shaft of the transducer 26 is also connected to the readout instrument 64 to provide steering information to the pilot.

Prior to the ground track signals passing through the gear changers 82 and 82', the outputs of the integrators 81 and 81' are tapped mechanically by means of the differentials 88 and 88' to drive an aircraft- or plane-position recording system. The X component of plane-position appears at the output of the differential 88 which drives the input shaft of a plane-position transducer 89 and another plane-position transducer 91 through stepdown gears 92. The electrical output signal from the transducer 89 provides a permanent record of the actual plane position on the 330-mile range, regardless of the tactical scale manipulaitons and bug slewing; and the signal from the transducer 91 provides a permanent record of actual plane position on the 80-mile scale. Similarly, the Y component of the plane position is permanently recorded by a transducer 89' and a transducer 91' in combination with stepdown gears 92'. The manner in which these transducers are initially oriented or "notched" with respect to the take-off position of the aircraft will be discussed later in the disclosure.

Markers and strobes

Primary positioning of the green marker mirror 21 is effected through the green marker mirror transducers 32 and 33 which are electrically actuated by the green marker slew switch 48 to produce X and Y components of displacement of the marker 13, respectively. In a similar manner, the red marker mirror 21 is rotated to produce X and Y components of displacement of the marker 13' by switch 48', and transducers 32' and 33'. A secondary means for positioning the markers 13 and 13' is also provided by the master slew switch 39. This switch operates a horizontal slew motor 97 and a vertical slew motor 94 to drive the green and red marker mirrors 21 in the corresponding directions by means of the shaft connection through mechanical differentials 96, 96' and 93, 93', respectively. The shaft outputs of the master slewing motors 97 and 94 also rotate the bug mirror 21 in the X and Y directions by their connection through mechanical differentials 99 and 98, respectively. Hence, operation of the master slew switch 39 will produce equal and simultaneous motion of the bug 12 and the green and red markers 13 and 13' on the display screen 11.

The angular positions or azimuths of the green and red strobes 14 and 14' and the ranges of their corresponding targets 16 and 16' are set by the manually adjustable range and azimuth controls 43, 43' and 47, 47', respectively. The settings appear on the strobe range counters 44, 44' and strobe azimuth counters 45, 45'. The mechanical positioning of the green strobe azimuth and range controls 47 and 43 are transformed into electrical voltages by transducers 101 and 102 operating the transducers 30 and 31, respectively, and thereby positioning the green target reticle 29 in accordance with the range setting setting and the green marker reticle 25 in accordance with the azimuth setting. The green strobe 14 is also adapted to be adjusted by range information at a remote station computed from sonobuoy signals derived by the JULIE technique of localizing submerged objects with sonobuoys. Range information from a remote source 100 is fed into a range adjusting transducer 103 when the ACCEPT push-button 51, connected thereto, is depressed. Simultaneously, a solenoid operated clutch 104 drivingly engages the mechanical output of the transducer 103 to the transducer 102 to produce an appropriate signal at the input to the target reticle transducer 31. The DATA XMIT signal light 52 is remotely energized to advise the pilot when range information pertinent to the mission is available at the output of the remote source 100. The mechanically interlocked REL push-button 53 releases the push-button 51 which, in turn, disengages the clutch 104. The red strobe azimuth and target range are similarly set by the controls 47' and 43' and remote source 100. As one application, it is thus possible for the main control unit 35 to receive range information from two JULIE-type sonobuoys. By the positioning of the green and red markers 13 and 13' at the corresponding ground position of the two sonobuoys, the strobes are manually rotated until the targets 16 and 16' coincide. This point of coincidence represents the position of a submerged object such as a submarine.

*Memory set*

As noted earlier, a MEMORY SET unit 37 is provided for memorizing the X and Y coordinates of a plurality of different positions or fixes. Electrical signals from any pair of X and Y transducers are stored depending on which symbol position is selected for recording on the unit 37. The RECORD MEMORY bar 67 will initiate recording action. The REL bar 68 is mechanically coupled to the RECORD MEMORY bar 67 to release the latter from a depressed position. The symbol position for storage in the MEMORY SET unit 37 is selected by a RECORD MEMORY push-button bank 106. When the push-button, identified by the symbol of the bug 12 is pushed, connections are separately made from bug position transducers 107 and 108 to the MEMORY SET unit 37. In a similar manner, the red marker push-button connects red marker position transducers 109' and 110'; the red target push-button connects red target position transducers 112' and 113', the green marker push-button connects green marker position transducers 109 and 110; and the green target push-button connects green target position transducers 112 and 113. The push-button release 71 is mechanically interlocked with the record memory bank 106 to release any depressed push-button therein. The green target position transducers 112 and 113, representing the X and Y coordinates, are mechanically driven by the shaft outputs of a mechanical resolver 114 which in turn has its input shafts connected to the azimuth control 47 and the range control 43. Red strobe transducers 112' and 113' are similarly connected through a resolver 114' to the controls 47' and 43'. The MODE switch 36 is electrically interlocked with PT O position of the unit 37 to prevent storage of X and Y coordinate signals unless the MODE switch 36 is in the STANDBY position. This insures that a POINT OPTION or other reference position cannot be accidentally erased or disturbed while the MODE switch 36 is in the RUN position.

*Read-out*

During certain tactical missions, the pilot may desire to fly the aircraft to a plurality of prescribed ground positions in sequence, he may desire to return to a ground position over which he has previously flown, or he may desire to know the aircraft position relative to another position such as an aircraft carrier, POINT OPTION, or a sonobuoy. The read-out instrument 64, which is separate from the display unit 10 and the main control unit 35 except for signal transmitting connections, is provided in the aircraft instrument panel for accomplishing these functions. The instrument 64 includes a compass card 115 which is drivingly connected to the output shaft of the bug reticle transducer 26 for indicating the aircraft heading on the ground track. A read-out resolver 117 resolves X and Y coordinates of a selected position relative to the aircraft at its input into polar coordinates, R and $\theta$. The angular coordinate, $\theta$, is algebraically added to the ground track heading at a mechanical differential 118 to drive a pointer 119 which is pivoted about the same center as the compass card 115. It is thus apparent that the angular displacement of the pointer 119 from the indicated heading on the compass card 115 will be equal to the steering angle. The pilot must then align the poilnter 119 with the indicated heading on the compass card 115 in order to fly toward the selected position. The distance coordinate, P, at the output of the resolver 117 is directly connected to a cyclometer type indicator 116.

The X and Y coordinate inputs to the read-out resolver 117 are connected to the outputs of two banks of read-out push-buttons 121 and 122. The read-out bank 121 establishes summing networks of the bug 12 with the red marker 13' or target 16', with any selected point in memory, or with the green marker 13 or target 16. One input of the read-out bank 121 is connected to the transducers 107 and 108 for providing the X and Y coordinates of the bug 12. Another input to the read-out bank 121 is connected to the transducers 109' and 110' for obtaining the X and Y coordinates of the red marker. Thus when the red marker push-button of bank 121 is depressed, transducers 107 and 109' are connected together in an X summing network and the output appears at the X coordinate input of the read-out resolver 117, and transducers 108 and 110' are connected together in a Y summing network and the Y coordinate output appears at the input of the read-out resolver 117. The green marker push-button provides similar summing information through the additional inputs from the green marker transducers 109 and 110; and the memory push-button from the memory set 37. For read-out of range and bearing between the bug 12 and either the green target 16 or red target 16', their respective push-buttons on the read-out bank 121 sum up the marker position with target and bug positions, because the target positions represented at the outputs of the transducers 112, 113 and 112', 113' are with respect to the markers 13 and 13'. This may best be shown with reference to FIG. 3, where the strobe 14 is set at $\theta=8°$ (clockwise from North) and $R=32$ nautical miles. The X and Y coordinates relative to the marker 13, as measured by the transducers 112 and 113 are $x=+4$ and $y=+30$, respectively. The total coordinates are:

$$\Sigma x=+37+37+4 \text{ or } +78$$

and $$\Sigma y=+35+30-15 \text{ or } +50$$

Thus, when the red target push-button on the read-out bank 121 is depressed, transducers 107, 109', and 112' are connected in an X suming network, and the transducers 108, 110', and 113' are connected in a Y summing network. The outputs of each network are connected to the read-out resolver 117. In a similar manner, depressing the green target push-button will connect the transducers 107 and 108 to their respective transducers 109, 112 and 110, 113, respectively. A mechanically interlocked release 66 will release any push-button which had been depressed.

The second read-out bank 122 establishes summing networks for reading the range and bearing from any selected point in memory to the red or green target, or to the actual position of the aircraft. As in reading the range and bearing from the bug 12 to the red or green targets, the X and Y coordinates of the red or green marker must be included in the summing network of the memory to red or green target of the read-out bank 122. Hence, the transducers for both the marker and the target of the red or green strobes 14 are summed up with the X and Y coordinates of the memory set unit 37. The resultant from each summing network is connected to the input of the read-out resolver 117. In order to read the range and bearing from any selected position in memory to the plane position, as provided by the appropriately marked push-button in the read-out bank 122, an additional input to the bank 122 is connected to the unit 37. The mechanical release 66 also releases any depressed push-button in bank 122.

*Position correction*

Immediately after the scale changers 82 and 82', there are mechanical differentials 123 and 123' for modifying the X and Y coordinates of bug position relative to the ground track signal at the output of the integrators 81 and 81'. The differentials 123 and 123' are provided for correcting or aligning the bug position to a landmark of known geographical position when the aircraft is "ON TOP" of the latter. A marker is used to represent the land mark on the screen 11. For example, when the "Bug-to-Red Marker" push-button of the position correction bank 124 is depressed, X and Y summing networks are established between the bug transducers 107 and 108 and the red marker transducers 109' and 110'. The difference signal, representing the displacement between the bug 12 and the marker 16' and appearing at the output of the bank 124, connects to a pair of X and Y position correction transducers 126 and 126', respectively. When the POSITION CORRECTION bar 69 is depressed, a pair of normally-open solenoid clutches 127 and 127' close to transmit shaft rotation from the motors 126 and 126' to the mechanical differentials 123 and 123', and transducers 126 and 126' produce shaft rotation an amount opposite to but proportional to the displacement. Complete corrective action causes the bug 12 to coincide with the red marker on the screen 11. In a similar manner, the green or red markers 13 or 13' can be positioned or aligned to any selected point in memory or to the bug 12 by depressing the appropriately marked push-button of the bank 124. The mechanically interlocked release 71 will release any push-button which had been depressed.

*Plane position storage*

As previously noted, a continuous record of the actual aircraft position is maintained on one of the two scales, 80- or 330-mile, regardless of the tactical scale manipulations and bug slewing occurring during a mission. This record is maintained on the plane position transducers 89 and 89' for the 330-mile scale, or transducers 91 and 91' on the 80-mile scale. However, it is necessary for the transducers to be initially "notched" to the geographical origin of the flight, namely, takeoff position. In addition to selecting the scale, the PLANE POSITION STORAGE control 38 is provided for establishing a summing network which compares either transducers 89 and 89' or transducers 91 and 91' to the position of the green target 16. In order to measure the total displacement, of course, it is necessary to include in this summing network the position of the green marker 13. Thus, when the control 38 is turned to the RESET 330 position, transducers 89 and 89' are connected in two separate summing networks with the green marker transducers 109 and 110 and the green target transducers 112 and 113. The algebraic sums of these networks at the output of the control 38 are connected to the X and Y position correction transducers 126 and 126'. In the RESET 330 position, a circuit is also completed by the control 38 to energize a pair of normally-open solenoid operated clutches 128 and 128'. The shaft rotations of the transducers 126 and 126' are thereby transmitted to the mechanical differentials 88 and 88' where they reposition the plane position transducers 89, 89', 91 and 91' relative to the shaft position at the output of the integrators 81 and 81'. The control 38 is spring biased toward the RUN position, therefore the operator must hold the control 38 in RESET position for sufficient time to allow the motors 126 and 126' to drive the plane position transducers to the green target position. When the control 38 is released, the clutches 128 and 128' are deenergized.

*Wind correction*

Under normal circumstances, it is usually desirable at least once during certain tactical missions, to reset the wind velocity components which were initially set into the system by the manually adjusted controls 57 and 58. A special facility is incorporated in the tactical navigation apparatus for automatically computing a new wind vector and inserting it into the system with the minimum of time and effort and without the need to fly the aircraft in any particular pattern at a constant speed.

A ground reference point is required in order for the apparatus to carry out a wind compuation. A "marker to bug" push-button in the position correction blank 124 is depressed prior to beginning a "wind-finding" maneuver. At the instant of visual "On-top" positioning of the aircraft over the ground reference point, the POSITION CORRECTION bar 69 is depressed and the marker is driven until it coincides with the bug. At the same instant, the bar 69 also started a timing cycle in a clock 129 and energized a normally open solenoid clutch 132. Total time appears at the electrical output of a timer transducer 131 connected to the clock 129 through the clutch 132. The clock 129 has a sufficient timing cycle to permit the pilot considerable freedom of maneuvering before he is required to fly back to the same reference point. Before the aircraft passes over the ground reference point the second time, the pilot depresses the "bug to marker" push-button in the bank 124. At the instant of visiual "On-top" positioning, he depresses the WIND bar 73. This causes the bug 12 to realign with the selected target or marker and, at the sime time, cause a pair of wind error transducers 133 and 133' to be mechanically rotated an amount opposite but proportional to displacement error. The X and Y correction signal which are in turn connected to the dividend inputs of X and Y dividers 134 and 134', respectively. The timer transducer 131 similarly transmits a total time elapsed signal to the divisor inputs of the dividers 134 and 134'. The electrical outputs thereof produce shaft rotations of X and Y wind component transducers 136 and 136' proportional to the quotient outputs of the dividers 134 and 134'. The WIND bar 73 energizes normally-open solenoid clutches 137 and 137' to establish a mechanical connection to the inputs of differentials 87 and 87'. At the completion of the automatic wind-setting operation, the clutch 132 is disengaged and the clock 129 is returned to its initial position by a bias means 138.

*Operation*

The operation of the tactical navigation system may be best described with reference to FIG. 5 which represents a typical ASW search, detection, localization, and attack mission plotted on a geographical scale suitable for use on the display screen 11. At the start of the mission, the aircraft is on the base carrier in the position shown by the solid-lined rectangle. The pilot, having received the proposed flight pattern by which an ASW search is to be executed, selects appropriate scales on both the PLANE STORAGE control 38 and RANGE SCALE selector 49. The selection is based upon the area of the search. POINT OPTION, a geographical reference point known to both the pilot and to certain carrier personnel and which is positioned within the area displayed on the screen 11, is recorded in memory by placing the MODE switch 36 in the STANDBY position, the MEMORY SET unit 37 on PT O, one of the green markers 13 at the corresponding POINT OPTION position on the screen 11. This position is then recorded into memory by depressing the RECORD MEMORY bar 67. Thereafter, it is impossible ot alter the memorized coordinates of POINT OPTION unless the MODE switch 36 is placed back into the STANDBY position. The take-off position of the aircraft on the carrier can also be recorded in memory if so desired by selecting a channel on the memory selector 37, placing the target 16 at the corresponding geographical position of the carrier and then depressing the RECORD MEMORY bar 67.

The bug 12 is then slewed to the take-off position. In order to slew the bug 12, the MODE switch 36 must be turned to the RUN position. When the bug 12 is in the take-off position, the MODE switch 36 is returned to STANDBY. The plane position transducers 89, 89', 91 and 91' are then aligned or "notched" to the take-off position by turning the PLANE STORAGE control 38 to the RESET 80 or RESET 330 position as appropriate. Since the RESET positions are spring-loaded, the control 38 must be held at RESET until the alignment process is completed. There is no indication when this process is complete, so it is necessary to keep the RESET engaged for a time sufficient to allow the plane position transducers to run through their maximum range of travel.

Certain turning points such TP1 and TP2 of the proposed flight, if known in advance, can be placed in memory in the same manner as POINT OPTION except that the MODE switch 36 may be in the RUN position. It is desirable, of course, to set the turning points in the form of distance and bearing from either POINT OPTION or from the carrier's position at take-off in order to establish precise positions. Other data may be recorded in memory to insure the safe return of the aircraft to its base and enable quick, accurate position reports from the aircrafts on targets to be made.

An initial wind is inserted into the system through the WIND SET and INDICATOR 54 in accordance with weather forecasts for the flight altitude expected to be flown during the mission.

It should be noted that any search pattern for an ASW mission can be flown in a variety of ways without the need for manual plotting at any time. But for the typical example used for illustration, the turning points TP1 and TP2 were put into memory in advance. After take-off, the first turning point, TP1 is selected on the MEMORY SET unit 37 and the "Bug to Memory" push-button of the read-out bank 121 is depressed. This will give the pilot steering information on the readout instrument 64 to TP1. As the range counter 116 reaches zero, the next turning point, TP2, is selected on the MEMORY SET unit 37 and this range and bearing will appear on the read-out instrument 64. This process would be repeated for subsequent memorized turning points.

An often useful alternative method of flying between turning points, is to set up one of the markers at the take-off point with its corresponding target at the first turning point. "Bug-to-Target" read-out is selected on the read-out bank 121 and the pilot is thereby presented with range and bearing to the first turning point on the read-out instrument 64. While the aircraft is enroute to the first turning point, the other marker can be positioned on the first turning point and the target therefor position at the second turning point. When the first turning point is reached, read-out to the next or second turning point will be obtained on the instrument 64 by selecting the appropriate "Bug-to-Target" push button on the read-out bank 121. This now leaves the first marker and target free to be positioned to shown a third turning point, if any. This process is aptly called "target-to-target" leap-frog.

A second alternative method of flying between turning points, which obviates the need to switch back and forth between read-out circuits, is to position the green and red markers and targets in alternate fashion as above, but instead of following read-out information, the pilot simply flies the bug visually along the strobe line connecting the marker to its corresponding target. Since the bug azimuth is showing the ground track, the problem of drift compensation does not arise.

Most "wind-finding" requirements will arise during routine navigation of search patterns. In such instances there will probably be no convenient reference point on which to establish a visual "on-top" mark. In the typical situation illustrated in FIG. 5, the following procedure may then be carried out. A few seconds before a sonobuoy A is dropped, the green or red "Marker-to-Bug" push-button of the bank 124 and the POSITION CORRECTION bar 69 are depressed and are held depressed until the instant of the sonobuoy release. This will leave the selected marker position over the sonobuoy A position and, at the same time, start a timing cycle in the clock 129. After any random flight pattern, the aircraft is again flown back over the sonobuoy A. When the aircraft is in "On-Top" position, the WIND bar 73 is pushed to effect a new wind setting into the system.

The aircraft then continues along the path indicated in FIG. 5 and dispatches a sonobuoy B thereby establishing a base line for localization of a submerged submarine. By means not a part of the present invention, range information from the sonobuoys A and B are determined and are transmitted to the range transducers 103 and 103'. The DATA XMIT signal light 52 indicates that such information is ready to be accepted into the apparatus. The ACCEPT push-button 51, which is then depressed, causes automatic adjustment of the length of the green and red strobes 14 and 14' to lengths proportional to the ranges computed between the sonobuoys A and B, respectively, and the detected object. The pilot may then manually adjust the green and red strobe azimuth controls 47 and 47' until the two targets 16 and 16' of their corresponding strobes 14 and 14' intersect. The intersection thus displays the position of the detected object on the screen 11. Based on additional information that the detected object is an enemy submarine, the pilot may depress the appropriate "Bug-to-Target" push-button of the read-out bank 121 to obtain range and bearing information from the aircraft to the submarine for purposes of an attack maneuver.

The positions of the sonobuoys A and B could also be pre-recorded into memory in which case the aircraft can be flown in accordance with "Bug-to-Memory" read-out information. In this situation, when the range counter 116 of the read-out instrument 64 registers zero, the appropriate sonobuoy is released. Alternatively, the pilot can simply "fly the bug" to a position marked in pencil on the display screen 11 and drop the sonobuoy. With the "Bug" push-button of the RECORD MEMORY bank 106 depressed, the sonobuoy release circuits may be parallelled to the RECORD MEMORY bar 67 thereby simultaneously memorizing the position of the sonobuoy where it is dropped.

Following an attack, a new position of the aircraft carrier, which has moved since take-off with respect to POINT OPTION, is obtained by radio communication. The new position of the carrier can then be recorded in memory and range and bearing information from the aircraft to the carrier can then be read-out to aid the pilot in directing the aircraft back to its base.

Obviously, the tactical navigation system is not limited specifically to anti-submarine warfare. It is a highly flexible system by which many flight patterns can be planned and executed. The versatility of the position correction and read-out functions are especially notable as they permit the system to be adapted to many varieties of situations. By proper and full use of the capabilities of the system and its associated equipment, the effectiveness of any tactical situation which is capable of being applied is considerably increased. In addition, the most normal navigational facilities incorporated in the tactical navigation system permits accurate and simple procedures in any large or small aircraft because it places the pilot and his aircraft in relative perspective to a complete tactical mission, and in addition provides him with steering information for a complete mission.

It will be understood that various changes in the details, materials, steps and arrangement of parts which have herein been described and illustrated in order to explain the nature of the invention, may be made by those skilled in the art within the principle and scope of the invention as expressed in the appended claims.

What is claimed is:

1. Display apparatus for correlating an aircraft ground track indication and a tactical situation, comprising, in combination: a transparent screen adapted to be mounted in an instrument panel of an aircraft; first light projecting means mounted adjacent to said screen for projecting an aircraft symbol on said screen; means for producing a signal responsive to the ground speed of the aircraft operatively connected to said first projecting means for moving said aircraft symbol on said screen in accordance with the ground track of the aircraft; means for producing a signal responsive to the ground track heading of the aircraft connected operatively to said projecting means, means for rotating said aircraft symbol on said screen in accordance with the heading; second light projecting means mounted adjacent to said screen for projecting a marker symbol and strobe symbol radiating therefrom on said screen, said strobe further characterized by a target symbol at the outer end; slewing means operatively connected to said second projecting means for manually positioning said marker symbol on said screen; azimuth means operatively connected to said second projecting means for manually rotating said marker symbol; range means operatively connected to said second projecting means for adjusting the length of said strobe symbol; transducer means operatively connected to said first and second projecting means for producing symbol position signals; read-out means for indicating the range and bearing between selected pairs of said aircraft symbol, said marker symbol, or said target symbol; and selector means operatively connected between said read-out means and said transducer means for selectively indicating the position of one of said symbols relative to the position of another of said symbols.

2. Display apparatus for correlating an aircraft ground track indication and a tactical situation, comprising, in combination: a transparent screen adapted to be mounted in an instrument panel of an aircraft; first projecting means mounted adjacent to said screen for projecting a first light beam on said screen; a first rotatable reticle optically positioned in said first projecting means for forming an aircraft symbol on said screen from said first light beam; a first pivotal mirror optically disposed between said first rotatable reticle and said screen for reflecting said aircraft symbol onto said screen; means for producing a signal responsive to the ground speed of the aircraft; integrator means operatively connected between said ground speed responsive means and said first pivotal mirror for moving said aircraft symbol on said screen in accordance with the ground track of the aircraft; means for producing a signal responsive to the ground track heading of the aircraft operatively connected to said first rotatable reticle for rotating said aircraft symbol on said screen in accordance with heading; second projecting means mounted adjacent to said screen for projecting a second light beam on said screen; a second rotatable reticle optically positioned in said second projecting means for forming a marker symbol from said second light beam, a second pivotal mirror optically disposed between said second rotatable reticle and said screen for reflecting said marker symbol onto said screen; slewing means operatively connected to said second pivotal mirror for manually positioning said marker symbol on said screen; azimuth means operatively connected to said second rotatable reticle for manually rotating said marker symbol; a slidable reticle connected to said second rotatable reticle for rotation therewith and slidable relative thereto for forming a strobe from said second light beam radiating from said marker symbol and characterized by a target symbol at the outer end; range means operatively connected to said slidable reticle for manually adjusting the length of said strobe; transducer means operatively connected to said mirrors, said second rotatable reticle, and said slidable reticle for producing symbol position signals; symbol position storage means for memorizing a plurality of said signals; first selector means operatively connected between said transducer means and said storage means for selectively storing one of said signals; read-out means for indicating the range and bearing between selected pairs of said aircraft symbol, said marker symbol, said target symbol, or any position in memory; and second selector means operatively connected between said read-out means and said transducer means and between said read-out means and said storage means for selectively indicating the position of one of said symbols or any position of said memory relative to the position of another of said symbols.

3. Display apparatus for correlating an aircraft ground track indication and tactical situation, comprising, in combination: a main display unit adapted to be mounted in an instrument panel of an aircraft and supporting a transparent rectangular screen which encloses the front of said unit; first projecting means mounted in said display unit for projecting a first light beam on said screen; a first rotatable reticle optically positioned in said first projecting means for forming an aircraft symbol on said screen from said first light beam; a first mirror pivotal about two normal axes and optically disposed between said first rotatable reticle and said screen for reflecting said aircraft symbol onto said screen; means for producing a signal responsive to normal components of the ground speed of the aircraft, integrator means operatively connected between said component responsive means and said first mirror for moving said aircraft symbol on said screen in directions normal to each other in accordance with normal components of the ground track of the aircraft; means for producing a signal responsive to the ground track heading of the aircraft operatively connected to said first rotatable reticle for rotating said aircraft symbol on said screen in accordance with heading; second projecting means mounted in said display unit for projecting a second light beam on said screen; a second rotatable reticle optically positioned in said second projecting means for forming a marker symbol from said second light beam; a second mirror pivotal about two normal axes and optically disposed between said second rotatable reticle and said screen for reflecting said marker symbol onto said screen; slewing means operatively connected to said second mirror for manually positioning said marker symbol on said screen in directions normal to each other; azimuth means operatively connected to said second rotatable reticle for manually rotating said marker symbol; a slidable reticle connected to said second reticle for rotation therewith and slidable relative thereto for forming a strobe from said second light beam radiating from said marker symbol and characterized by a target symbol at the outer end; range means operatively connected to said slidable reticle for manually adjusting the length of said strobe; transducer means operatively connected on the two axes of said mirrors, on said second rotatable reticle, and on said slidable reticle for producing a pair of normal component position signals of said symbols; symbol position storage means for memorizing a plurality of said pairs of signals; first selector means operatively connected between said transducer means and said storage means for selectively storing any pair of said signals; read-out means for converting any selected pair of said signals into a range and bearing between said aircraft symbol, said marker symbol, said target symbol, or any position in memory and for indicating same; and second selector means operatively connected between said read-out means and said transducer means and between said read-out means and said storage means for selectively indicating the position of one of said symbols or any position of said memory relative to the position of another of said symbols.

4. Display apparatus for correlating an aircraft ground track indication and a tactical situation, comprising, in combination: a main display unit adapted to be mounted in an instrument panel of an aircraft and supporting a transparent rectangular screen which encloses the front of said unit; first projecting means mounted in said display unit for projecting a first light beam on said screen; a first rotatable reticle optically positioned in said first projecting means and said screen for forming an aircraft symbol on said screen from said first light beam; a first mirror pivotal about two normal axes and optically disposed between said first rotatable reticle and said screen for reflecting said aircraft symbol onto said screen; means for producing signals responsive to the normal components of the airspeed of the aircraft; manual wind setting means for producing normal components of a known wind velocity; differential means operatively connected at the inputs to said normal component responsive means and said wind setting means for computing the normal components of the aircraft ground speed; integrator means operatively connected between said differential means and said first mirror for moving said aircraft symbol on said screen in directions normal to each other in accordance with normal components of the ground track of the aircraft; means responsive to the ground track heading of the aircraft operatively connected to said first rotatable reticle for rotating said aircraft symbol on said screen in accordance with heading; second projecting means mounted in said display unit for projecting a second light beam on said screen; a second rotatable reticle optically positioned in said second projecting means for forming a marker symbol from said second light beam; a second mirror pivotal about normal axes and optically disposed between said second rotatable reticle and said screen for reflecting said marker symbol onto said screen; slewing means operatively connected to said second pivotal mirror for manually positioning said marker symbol on said screen in directions normal to each other; azimuth means operatively connected to said second rotatable reticle for manually rotating said marker symbol; a slidable reticle connected to said second rotatable reticle for rotation therewith and slidable relative thereto for forming a strobe from said second light beam radiating from said marker symbol and characterized by a target symbol at the outer end; range means operatively connected to said slidable reticle for manually adjusting the length of said strobe; transducer means operatively connected on the two axes of said mirrors, on said second rotatable reticle, and on said slidable reticle for producing a pair of normal component position signals of said symbols; symbol position storage means for memorizing a plurality of said pairs of signals; first selector means operatively connected between said transducer means and said storage means for selectively storing any pair of said signals; read-out means for converting any selected pair of said signals into a range and bearing between said aircraft symbol, said marker symbol, said target symbol, or any position in memory and for indicating same; and second selector means operatively connected between said read-out means and said transducer means and between said read-out means and said storage means for selectively indicating the position of one of said symbols or any position of said memory relative to the position of another of said symbols.

5. Apparatus as set forth in claim 4 and further comprising: switch means operatively connected to said symbol position storage means for selectively connecting one of any pair of position signals for memory only while the remaining functions of said apparatus are disabled.

6. Display apparatus for correlating an aircraft ground track indication and a tactical situation, comprising, in combination: a transparent screen adapted to be mounted in an instrument panel of an aircraft; first light projecting means mounted adjacent to said screen for projecting an aircraft symbol of one color onto said screen; means for producing a signal responsive to the ground speed of the aircraft operatively connected to said first projecting means for moving said aircraft symbol on said screen in accordance with the ground track of the aircraft; means for producing a signal responsive to the ground track heading of the aircraft operatively connected to said first projecting means for rotating said aircraft symbol on said screen in accordance with heading; second light projecting means mounted adjacent to said screen for projecting a first marker symbol and strobe symbol of a second color onto said screen, said strobe symbol further characterized as a line radiating from said marker symbol with a first target symbol at the outer end; third projecting means mounted adjacent to said screen for projecting a second marker symbol and strobe symbol of a third color onto said screen; slewing means operatively connected to said second and third projecting means for positioning said marker symbols on said screen independently of each other; azimuth means operatively connected to said second and third projecting means for rotating said marker symbols independently of each other; range means operatively connected to said second and third projecting means for adjusting the length of said strobe symbols independently of each other; transducer means operatively connected to each of said projecting means for producing symbol position signals; symbol position storage means for memorizing a plurality of said signals; first selector means operatively connected between said transducer means and said storage means for selectively storing one of said signals; read-out means for indicating the range and bearing between any selected pair of said aircraft symbol, said marker symbols, said target symbols, or any position in memory; and second selector means operatively connected between said read-out means and said transducer means and between said read-out means and said storage means for selectively indicating the position of one of said symbols or any position of said memory relative to the position of another of said symbols.

7. Display apparatus for correlating an aircraft ground track indication and a tactical situation, comprising, in combination: a transparent screen adapted to be mounted in an instrument panel of an aircraft; first projecting means mounted adjacent to said screen for projecting a first light beam of one color on said screen; a first rotatable reticle optically positioned in said first projecting means for forming an aircraft symbol on said screen from said first light beam; a first pivotal mirror optically disposed between said first rotatable reticle and said screen for reflecting said aircraft symbol onto said screen; means for producing a signal responsive to the ground speed of the aircraft, integrator means operatively connected between said ground speed responsive means and said first mirror for moving said aircraft symbol on said screen in accordance with the ground track of the aircraft; means for producing a signal responsive to the ground track heading of the aircraft operatively connected to said first rotatable reticle means for rotating said aircraft symbol on said screen in accordance with heading; second projecting means mounted adjacent to said screen for projecting a second light beam of a second color on said screen; a second rotatable reticle optically positioned on said second projecting means for forming a first marker symbol from said second light beam; a second pivotal mirror optically disposed between said second rotatable reticle and said screen for reflecting said first marker symbol on said screen; first slewing means operatively connected to said second mirror for manually positioning said first marker symbol on said screen; first azimuth means operatively connected to said second rotatable reticle for manually rotating said first marker symbol; a first slidable reticle connected to said second rotatable reticle for rotation therewith and slidable relative thereto for forming a first strobe from said second light beam radiating from said first marker symbol and characterized by a first target symbol at the outer end; third projecting means mounted adjacent to said screen for projecting a third light beam of a third color on said screen; a third rotatable reticle optically positioned in said third projecting means for forming a second marker symbol from said third light beam; a third pivotal mirror optically disposed between said third rotatable reticle and said screen for reflecting said second marker symbol onto said screen; second slewing means operatively connected to said third mirror for manually positioning said second marker symbol on said screen; second azimuth means operatively connected to said third rotatable reticle for manually rotating said second marker symbol; a second slidable reticle connected to said third rotatable reticle for rotation therewith and slidable thereto for forming a second strobe from said third light beam radiating from said second marker symbol and characterized by a second target symbol at the outer end; range means operatively connected to said slidable reticles for remotely and independently adjusting the length of said first and second strobes; transducer means operatively connected to said mirrors, said second and third rotatable reticles, and said first and second slidable reticles for producing symbol position signals; symbol position storage means for memorizing a plurality of said signals; first selector means operatively connected between said transducer means and said storage means for selectively storing one of said signals; a read-out means for indicating the range and bearing between any selected pair of said aircraft symbol, said first and second marker symbols, said first or second target symbols, or any position in memory; and second selector means operatively connected between said read-out means and said transducer means and between said read-out means and said storage means for selectively indicating the position of one of said symbols or any position of said memory relative to the position of another of said symbols.

8. Display apparatus for correlating an aircraft ground track indication and a tactical situation, comprising, in combination: a main display unit adapted to be mounted in an instrument panel of an aircraft and supporting a transparent rectangular screen which encloses the front of said unit; first projecting means mounted in said display unit for projecting a first light beam of one color on said screen; a first rotatable reticle optically positioned in said first projecting means for forming an aircraft symbol on said screen from said first light beam; a first mirror pivotal about two normal axes and optically disposed between said first rotatable reticle and said screen for reflecting said aircraft symbol onto said screen; means for producing a signal responsive to normal components of the ground speed of the aircraft, integrator means operatively connected between said component responsive means and said first mirror for moving said aircraft symbol on said screen in two directions normal to each other in accordance with normal components of the ground track of the aircraft; means for producing a signal responsive to the ground track heading of the aircraft operatively connected to said first rotatable reticle for rotating said aircraft symbol on said screen in accordance with heading; second projecting means mounted in said display unit for projecting a second light beam of a second color on said screen; a second rotatable reticle optically positioned in said second projecting means for forming a first marker symbol from said second light beam; a second miror pivotal about two normal axes and optically disposed between said second rotatable reticle and said screen for reflecting said first marker symbol onto said screen; first slewing means operatively connected to said second mirror for manually positioning said first marker symbol on said screen in two directions normal to each other; first azimuth means operatively connected to said second rotatable reticle for manually rotating said first marker symbol; a first slidable reticle connected to said second rotatable reticle for rotation therewith and slidable relative thereto for forming a first strobe from said second light beam radiating from said first marker symbol and characterized by a first target symbol at the outer end; third projecting means mounted in said display unit for projecting a third light beam of a third color on said screen; a third rotatable reticle optically positioned in said third projecting means for forming a second marker symbol from said third light beam, a third mirror pivoted about two normal axes optically disposed between said third rotatable reticle and said screen for reflecting said second marker symbol onto said screen, second slewing means operatively connected to said third mirror for manually positioning said second marker symbol on said screen in two directions normal to each other; second azimuth means operatively connected to said third rotatable reticle for manually rotating said second marker symbol; a second slidable reticle connected to said third rotatable reticle for rotation therewith and slidable relative thereto for forming a second strobe from said third light beam radiating from said second marker symbol and characterized by a second target symbol at the outer end; range means operatively connected to said slidable reticles for remotely and independently adjusting the length of said first and second strobes; transducer means operatively connected on the two axes of said mirrors, on said second and third rotatable reticles, and on said first and second slidable reticles for producing a pair of normal component position signals of said symbols, symbol position storage means for memorizing a plurality of said pairs of signals; first selector means operatively connected between said transducer means and said storage means for selectively storing any pair of said signals; read-out means for converting any selected pair of said signals into a range and bearing between said aircraft symbol, said first and second marker symbols, said first or second target symbols, or any position in memory and for indicating same, and second selector means operatively connected between said read-out means and said transducer means and between said read-out means and said storage means for selectively indicating the position of one of said symbols or any position of said memory relative to the position of the other of said symbols.

9. Display apparatus for correlating an aircraft ground track indication and a tactical situation, comprising, in combination: a main display unit adapted to be mounted in an instrument panel of an aircraft and supporting a transparent rectangular screen which encloses the front of said unit; first projecting means mounted in said display unit for projecting a first light beam of one color on said screen; a first rotatable reticle optically positioned in said first projecting means for forming an aircraft symbol on said screen from said first light beam; a first mirror pivotal about two normal axes optically disposed between said first rotatable reticle and said screen for reflecting said aircraft symbol onto said screen; means for producing a signal responsive to normal components of the airspeed of the aircraft, manual wind setting means for producing normal components of a known wind velocity; differential means operatively connected at the inputs to said normal component responsive means and said wind setting means for computing the normal components of the aircraft ground speed; integrator means operatively connected between said differential means and the axes of said first mirror for moving said aircraft symbol on said screen in two directions normal to each other in accordance with normal components of the ground track of the aircraft; means responsive to the ground track heading of the aircraft operatively connected to said first rotatable reticle for rotating said aircraft symbol on said screen in accordance with heading; second projecting means mounted in said display unit for projecting a second light beam of another color on said screen; a second rotatable reticle optically positioned in said second projecting means for forming a first marker symbol from said second light beam; a second mirror pivotal about two normal axes optically disposed between said second rotatable reticle and said screen for reflecting said first marker symbol onto said screen; first slewing means operatively connected on the axes of said second mirror for manually positioning said first marker symbol on said screen in two directions normal to each other; first azimuth means operatively connected to said second rotatable reticle for manually rotating said first marker symbol; a first slidable reticle connected to said second rotatable reticle for rotation therewith and slidable relative thereto for forming a first strobe from said second light beam radiating from said first marker symbol and characterized by a first target symbol at the outer end; third projecting means mounted in said display unit for projecting a third light beam of a third color on said screen; a third rotatable reticle optically positioned in said third projecting means for forming a second marker symbol from said third light beam; a third mirror pivoted about two normal axes optically disposed between said third rotatable reticle and said screen for reflecting said second marker symbol onto said screen; second slewing means operatively connected on the axes of said third mirror for manually positioning said second marker symbol on said screen in two directions normal to each other; second azimuth means operatively connected to said third rotatable reticle for manually rotating said second marker symbol; a second slidable reticle connected to said third rotatable reticle for rotation therewith and slidable relative thereto for forming a second strobe from said third light beam radiating from said second marker symbol and characterized by a second target symbol at the outer end; range means operatively connected to said slidable reticles for remotely and independently adjusting the lengths of said first and second strobes; transducer means operatively connected on the axes of said mirrors, on said second and third rotatable reticles, and on said first and second slidable reticles for producing a pair of normal component position signals of said symbols; symbol position storage means for memorizing a plurality of said pairs of signals; first selector means operatively connected between said transducer means and said storage means for selectively storing any pair of said signals; a read-out means for converting any selected pair of said signals into a range and bearing between said aircraft symbol, said first and second marker symbols, said first or second target symbols, or any position in memory and for indicating same; and second selector means operatively connected between said read-out means and said transducer means and between said read-out means and said storage means for selectively indicating the position of one of said symbols or any position of said memory relative to the position of another of said symbols.

10. A display apparatus for indicating the ground track of an aircraft, comprising, in combination: a transparent screen adapted to be mounted in an instrument panel of the aircraft; first light projecting means mounted adjacent to said screen for projecting an aircraft symbol on said screen; means for producing a signal responsive to the ground speed of the aircraft operatively connected to said first projecting means for moving said aircraft symbol on said screen in accordance with the ground track of the aircraft; second projecting means mounted adjacent to said screen for projecting a marker symbol and strobe on said screen; manual slewing means operatively connected to said second projecting means for positioning said marker symbol on said screen; transducer means operatively connected to said projecting means for producing position signals for each of said symbols; position correction means operatively connected to said first and second projecting means for modifying the position of said symbols; and selector means operatively connected between said transducer means and said position correction means for selectively positioning one of said symbols to the position of the other of said symbols.

11. A display apparatus for indicating the ground track of an aircraft, comprising, in combination: a transparent screen adapted to be mounted in an instrument panel of the aircraft; first projecting means mounted adjacent to said screen for projecting a first light beam on said screen; a first reticle optically positioned in said first projecting means for forming an aircraft symbol on said screen from said first light beam; a first pivotal mirror optically disposed between said first reticle and said screen for reflecting said aircraft symbol onto said screen; means for producing a signal responsive to the ground speed of the aircraft; integrator means operatively connected between said ground speed responsive means and said first mirror for moving said aircraft symbol on said screen in accordance with the ground track of the aircraft; second projecting means mounted adjacent to said screen for projecting a second light beam on said screen; a second reticle optically positioned in said second projecting means for forming a marker symbol from said second light beam; slewing means operatively connected to said second pivotal mirror for manually positioning said marker symbol on said screen; transducer means operatively connected to said mirrors for producing position signals for each of said symbols; position correction means operatively connected to said mirrors for modifying the motion of said symbols; and selector means operatively connected between said transducer means and said position correction means for selectively positioning one of said symbols at the position of the other of said symbols.

12. A display apparatus for indicating the ground track of an aircraft, comprising, in combination: a housing adapted to be mounted in an instrument panel of the aircraft having a transparent rectangular screen enclosing the front thereof; first projecting means mounted in said display unit for projecting a first light beam on said screen; a first reticle optically positioned in said first projecting means for forming an aircraft symbol on said screen from said first light beam; a first mirror pivotal about two normal axes optically disposed between said first reticle and said screen for reflecting said aircraft symbol onto said screen; means for producing signals responsive to normal components of the ground speed of the aircraft; integrator means operatively connected between said component responsive means and said first mirror for moving said aircraft symbol on said screen in directions normal to each other in accordane with normal components of the ground track of the aircraft; second projecting means mounted in said display unit for projecting a second light beam on said screen; a second reticle optically positioned in said second projecting means for forming a marker symbol from said light beam; manual slewing means operatively connected to said second pivotal mirror for positioning said marker symbol on said screen; transducer means operatively connected on the two axes of each of said mirrors for producing a pair of position signals for each of said symbols; position correction means operatively connected to said first and second mirrors for modifying the motion of said symbols; and a correction selector operatively connected between said transducer means and said position correction means for selectively positioning one of said symbols at the position of the other of said symbols.

13. A display apparatus for indicating the ground track of an aircraft, comprising, in combination: a transparent screen adapted to be mounted in an instrument panel of the aircraft; first light projecting means mounted adjacent to said screen for projecting an aircraft symbol on said screen, means for producing a signal responsive to the ground speed of the aircraft operatively connected to said first projecting means for moving said aircraft symbol on said screen in accordance with the ground track of the aircraft, second projecting means mounted adjacent to said screen for projecting a marker symbol on said screen, manual slewing means operatively connected to said second positioning means for positioning said marker symbol on said screen; transducer means operatively connected to said first and second positioning means for producing position signals for each of said symbols, position correction means operatively connected to said first positioning means for modifying the position of said aircraft symbol, selector means operatively connected between said transducer means and said position correction means for positioning said aircraft symbol at the position of said marker symbol, timer transducer means initiated by said selector means for producing a total time signal, error transducer means operatively connected to said first positioning means for producing a signal in accordance with the displacement of said aircraft symbol from said marker symbol, dividing means operatively connected to said error and time transducer means for producing a wind velocity output signal, and differential means connecting said output signal to said ground speed responsive means.

14. A display apparatus for indicating the ground track of an aircraft, comprising, in combination: a housing adapted to be mounted in an instrument panel of the aircraft and enclosed by a transparent screen mounted on the front thereof, projecting means mounted in said housing for projecting a first light beam, a first pivotal mirror optically disposed between said first projecting means and said screen for reflecting said first beam onto screen, means for producing a signal responsive to the true airspeed of the aircraft, manual wind setting means for producing a signal according to an estimate of the wind speed; differential means operatively connected at its inputs to the true airspeed responsive means and said wind setting means for computing the aircraft ground speed; integrator means operatively connected between said differential means and said first mirror for moving said beam on said screen in accordance with the ground track of the aircraft, second projecting means mounted in said housing for projecting a second light beam, a second pivotal mirror optically disposed between said second projecting means and said screen for reflecting said second beam onto said screen; slewing means operatively connected to said second mirror for manually positioning said beam on said screen; transducer means operatively connected to said first and second mirrors for producing position signals for each of said symbols, position correction means operatively connected to said first mirror for modifying the position of said beam on said screen, selector means operatively connected between said transducer means and said position correction means for positioning said first beam to coincide with said second beam at said screen, timer transducer means initiated by said selector means for producing a total time signal, error transducer means operatively connected to said first mirror for producing a signal in accordance with the displacement of said first beam from said second beam, dividing means operatively connected to said error and time transducer means for producing a wind velocity output signal, and means connecting said output signal to said manual wind setting means.

15. A display apparatus for indicating a ground track of an aircraft, comprising, in combination: a housing adapted to be mounted in an instrument panel of the aircraft and enclosed by a transparent screen mounted on the front end thereof, projecting means mounted in said housing for projecting a light beam on said screen, a reticle optically positioned in said projecting means for forming an aircraft symbol on said screen from said light beam, a pivotal mirror optically disposed between said reticle and said screen for reflecting said symbol on said screen, means for producing a signal responsive to the true airspeed of the aircraft, manual wind setting means for producing a signal according to an estimate of the wind speed, differential means operatively connected at its inputs to the true airspeed differential means and said wind setting means for computing the aircraft ground speed, integrator means operatively connected between said differential means and said mirror for moving said aircraft symbol on said screen in accordance with the ground track of the aircraft, means responsive to the ground track heading of the aircraft operatively connected to said reticle for rotating said aircraft symbol on said screen in accordance with the heading, transducer means operatively connected to the output of said integrator means for continuously recording the ground position of the aircraft from a known geographical position, and aircraft symbol holding means operatively connected between said integrator and said mirror for stopping motion of the aircraft symbol irrespective of the integrator output signal.

References Cited by the Examiner
UNITED STATES PATENTS

| | | | |
|---|---|---|---|
| 2,872,272 | 2/1959 | Schuck | 346—8 |
| 2,916,202 | 12/1959 | Beishline | 346—8 |
| 2,930,668 | 3/1960 | Behrmann et al. | 346—8 |

JEWELL H. PEDERSEN, *Primary Examiner.*

BENJAMIN A. BORCHELT, SAMUEL FEINBERG,
*Examiners.*

O. B. CHEW II, V. R. PENDEGRASS, P. G. BETHERS,
*Assistant Examiners.*